US010202913B2

(12) United States Patent
Xiao et al.

(10) Patent No.: US 10,202,913 B2
(45) Date of Patent: Feb. 12, 2019

(54) METHOD AND SYSTEM FOR BOOSTED ENGINE SYSTEM

(71) Applicant: Ford Global Technologies, LLC, Dearborn, MI (US)

(72) Inventors: Baitao Xiao, Canton, MI (US); Matthew Blake Tranter, Brighton, MI (US); Justin Lesniak, Bay City, MI (US); W. Cary Cole, Wixom, MI (US); Matthew John Gerhart, Dearborn Heights, MI (US); Tyler Kelly, Plymouth, MI (US); Corey Ducklow, Novi, MI (US); Adam Nathan Banker, Canton, MI (US); Erik Mikael Hellstrom, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 70 days.

(21) Appl. No.: 15/425,951

(22) Filed: Feb. 6, 2017

(65) Prior Publication Data
US 2018/0223751 A1    Aug. 9, 2018

(51) Int. Cl.
| F02D 41/00 | (2006.01) |
| F02D 41/08 | (2006.01) |
| F01M 13/02 | (2006.01) |
| F02M 35/10 | (2006.01) |
| B60C 23/14 | (2006.01) |
| F02B 37/04 | (2006.01) |

(Continued)

(52) U.S. Cl.
CPC ......... *F02D 41/0007* (2013.01); *B60C 23/14* (2013.01); *B60G 17/0526* (2013.01);
(Continued)

(58) Field of Classification Search
CPC ..... F02D 41/007; F02D 41/08; F01M 13/023; F02M 35/10229; B60C 23/14; F02B 37/04; F02B 37/127; F02B 37/18
See application file for complete search history.

(56) References Cited

U.S. PATENT DOCUMENTS

| 5,291,916 A | 3/1994 | Kloosterman et al. |
| 6,938,420 B2 | 9/2005 | Kawamura et al. |

(Continued)

FOREIGN PATENT DOCUMENTS

| CN | 201972892 U | 9/2011 | | |
| JP | WO 2005085611 A1 * | 9/2005 | ............... | F01N 3/22 |

(Continued)

OTHER PUBLICATIONS

Xiao, Baitao, et al., "Methods and Systems for Boost Control," U.S. Appl. No. 14/942,487, filed Nov. 16, 2015, 38 pages.

(Continued)

*Primary Examiner* — Audrey K Bradley
(74) *Attorney, Agent, or Firm* — Julia Voutyras; McCoy Russell LLP

(57) ABSTRACT

Methods and systems are provided for operating an electric supercharger as an on-board air pump and/or vacuum pump. During conditions when a vehicle is not being propelled and the vehicle engine is idling, a portion of an air intake passage is sealed and the supercharger is operated to deliver compressed air into the sealed portion. Compressed air can then be picked up directly from the sealed portion for use in tire inflation, or picked up via an ejector to provide vacuum for vacuum actuators.

19 Claims, 5 Drawing Sheets

(51) Int. Cl.
  *F02B 37/12* (2006.01)
  *F02B 37/18* (2006.01)
  *F02M 25/08* (2006.01)
  *F01M 13/00* (2006.01)
  *B60G 17/052* (2006.01)

(52) U.S. Cl.
  CPC ...... *F01M 13/0011* (2013.01); *F01M 13/021* (2013.01); *F01M 13/023* (2013.01); *F02B 37/04* (2013.01); *F02B 37/127* (2013.01); *F02B 37/18* (2013.01); *F02D 41/08* (2013.01); *F02M 25/0836* (2013.01); *F02M 35/10163* (2013.01); *F02M 35/10229* (2013.01); *F01M 2013/027* (2013.01)

(56) References Cited

U.S. PATENT DOCUMENTS

| | | | |
|---|---|---|---|
| 8,925,520 | B2 | 1/2015 | Pursifull et al. |
| 9,175,783 | B2 | 11/2015 | Rollinger et al. |
| 2006/0016477 | A1 | 1/2006 | Zaparackas |
| 2011/0186151 | A1 | 8/2011 | Sparazynski |
| 2016/0059643 | A1 | 3/2016 | Infantini |
| 2017/0016388 | A1 | 1/2017 | Xiao et al. |
| 2017/0016389 | A1 | 1/2017 | Xiao et al. |

FOREIGN PATENT DOCUMENTS

| | | |
|---|---|---|
| KR | 20100007204 A | 1/2010 |
| KR | 20100109086 A | 10/2010 |

OTHER PUBLICATIONS

Xiao, Baitao, et al., "Method and System for Boost Pressure Control," U.S. Appl. No. 15/160,832, filed May 20, 2016, 49 pages.
Xiao, Baitao, et al., "Method and System for Boost Pressure Control," U.S. Appl. No. 15/160,880, filed May 20, 2016, 51 pages.
Matalavage, Jill, et al., "Report on the Design and Testing of a Vacuum Aspirator," Department of Aerospace and Mechanical Engineering, University of Notre Dame, Apr. 29, 1999, 29 pages.

* cited by examiner

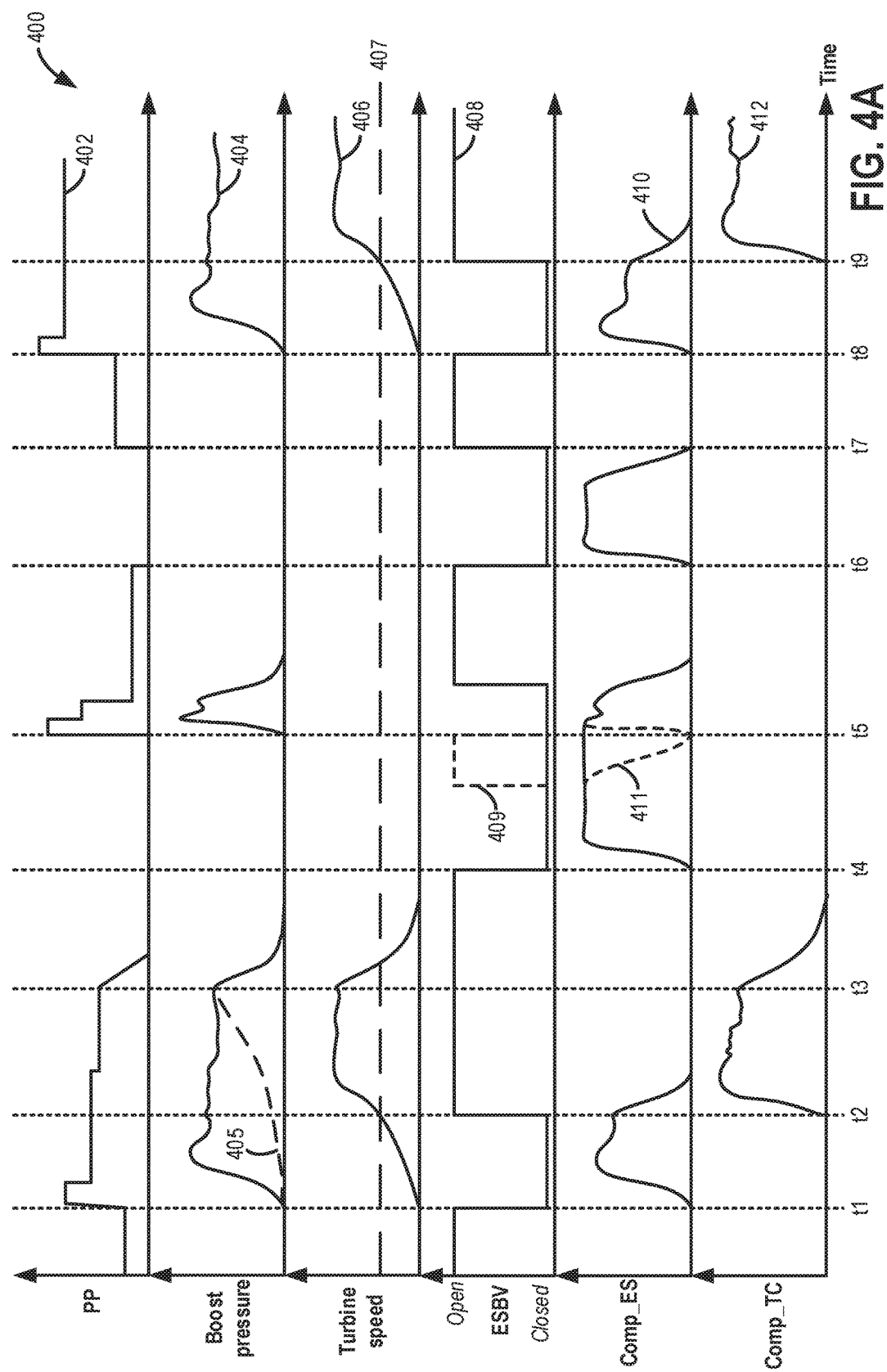

METHOD AND SYSTEM FOR BOOSTED ENGINE SYSTEM

FIELD

The present description relates generally to methods and systems for using an electric supercharger as an on-board air pump or vacuum pump.

BACKGROUND/SUMMARY

Engines may be configured with boosting devices, such as turbochargers or superchargers, to increase mass airflow into a combustion chamber. Turbochargers and superchargers compress intake air entering the engine using an intake compressor. While a turbocharger includes a compressor that is driven by a turbine, a supercharger includes a compressor that is driven by the engine, or by a motor. In some engine systems, one or more intake charging devices may be staged in series or parallel to improve engine boost response.

One example of a multi-staged boosted engine is shown by Kawamura et al. in U.S. Pat. No. 6,938,420. Therein, an electric supercharger driven by an electric motor and an electric supercharger bypass valve (ESBV) are staged downstream of a turbocharger. During conditions when the turbocharger compressor is not spun up, the ESBV may be closed and the electric supercharger may be rotated to provide a transient positive boost pressure in order to reduce turbo lag. Then, when the turbocharger compressor is sufficiently spun up, the ESBV may be opened and the electric supercharger may be disabled, allowing the turbocharger to provide the desired boost pressure.

In addition to intake charging devices, vehicles may be configured with on-board air and/or vacuum pumps. For example, on-board air pumps may be used for multiple purposes such as for inflating tires, inflating air suspension, etc. Likewise, on-board vacuum pumps may be used as a source of vacuum for various engine vacuum actuators, such as for fuel vapor canister purging, or a brake booster. While the additional pumps may enable a reliable source of air or vacuum to be provided, their use may be limited by their costs and sizes. In still other approaches, such as shown by Infantini in US 20160059643, a portion of compressed air delivered to the engine cylinders of an off-road vehicle (such as a plow) may be used for tire inflation. The portion of compressed air diverted may be based on the tire pressure. However, the diversion of compressed air from the engine causes the engine output to be reduced, affecting vehicle performance.

The inventors herein have recognized that an electric supercharger of a staged engine system can be combined with a pressurized air pick-up to advantageously provide the functionality of an on-board air pump and/or vacuum pump. In one example, a method for an engine comprises: during engine idling and while a vehicle is not propelled, sealing a portion of an intake passage by closing each of an intake throttle and a bypass valve coupled to an electric supercharger; operating the supercharger to generate compressed air in the sealed portion; and drawing the compressed air from the sealed portion into a device. In this way, a reliable source of compressed air and/or vacuum can be provided on-board a vehicle using existing components and without affecting vehicle performance.

As an example, an electric supercharger (ES) including a compressor driven by an electric motor may be staged upstream of a turbocharger (TC) including a compressor driven by an exhaust turbine. An electric supercharger bypass valve (ESBV) may be coupled in a bypass around the ES. During conditions when boost pressure is demanded, turbo lag may be reduced by closing the ESBV and operating the ES compressor to meet the boost demand while the turbine spools up. Once the turbine has spooled up, the ESBV may be opened and the ES compressor may be disabled while the TC compressor is used to meet the boost demand. During conditions when the engine is idling and the vehicle is stopped, the ES compressor may be opportunistically operated as an air pump or a vacuum pump and compressed air or vacuum may be stored for later use, or used in situ such as for inflating vehicle tires or operating a vacuum actuator. Therein, the ESBV may be fully closed, and the opening of the intake throttle may be reduced such that there is just enough air to allow the engine to idle (and not stall). As a result of the valve adjustments, a volume of the intake passage between the two valves may be effectively sealed off. The ES compressor motor may then be operated at full duty cycle to generate compressed air in the sealed volume. A pick-up valve coupling a pressurized air pick-up to the sealed volume may be opened to enable the compressed air to be stored or immediately used. When vacuum is desired, the compressed air may be directed through an ejector coupled to the pressured air pick-up, thereby generating vacuum at the ejector. The generated vacuum may be stored or immediately used. When driver torque demand increases, or if vehicle propulsion is requested, the pick-up valve, the intake throttle, and the ESBV may be opened, and the ES compressor may return to being operated, as required, for meeting transient boost demands.

In this way, an existing intake charging device may be advantageously used as an on-board air pump and/or vacuum pump. By reducing the need for a dedicated on-board air pump and vacuum pump, a reliable air and vacuum source is provided on-board a vehicle with cost reduction and component reduction benefits. The technical effect of sealing off a portion of an intake passage and operating an electric supercharger compressor is that compressed air may be generated and delivered into the sealed area, wherefrom the compressed air may be easily picked-up. By closing an intake throttle when operating the electric supercharger as an air or vacuum pump, engine output is not affected during the pump operation. By coupling an ejector to the pressurized air pick-up, the same compressed air generated by the supercharger may be used as an air source or a vacuum source, as needed. By operating the supercharger as an air or vacuum pump during engine idling conditions, air and/or vacuum may be opportunistically generated without affecting engine or vehicle performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4B show an example operation of an electric supercharger for boost control, compressed air generation, and vacuum generation, according to the present disclosure.

DETAILED DESCRIPTION

Figure 1:
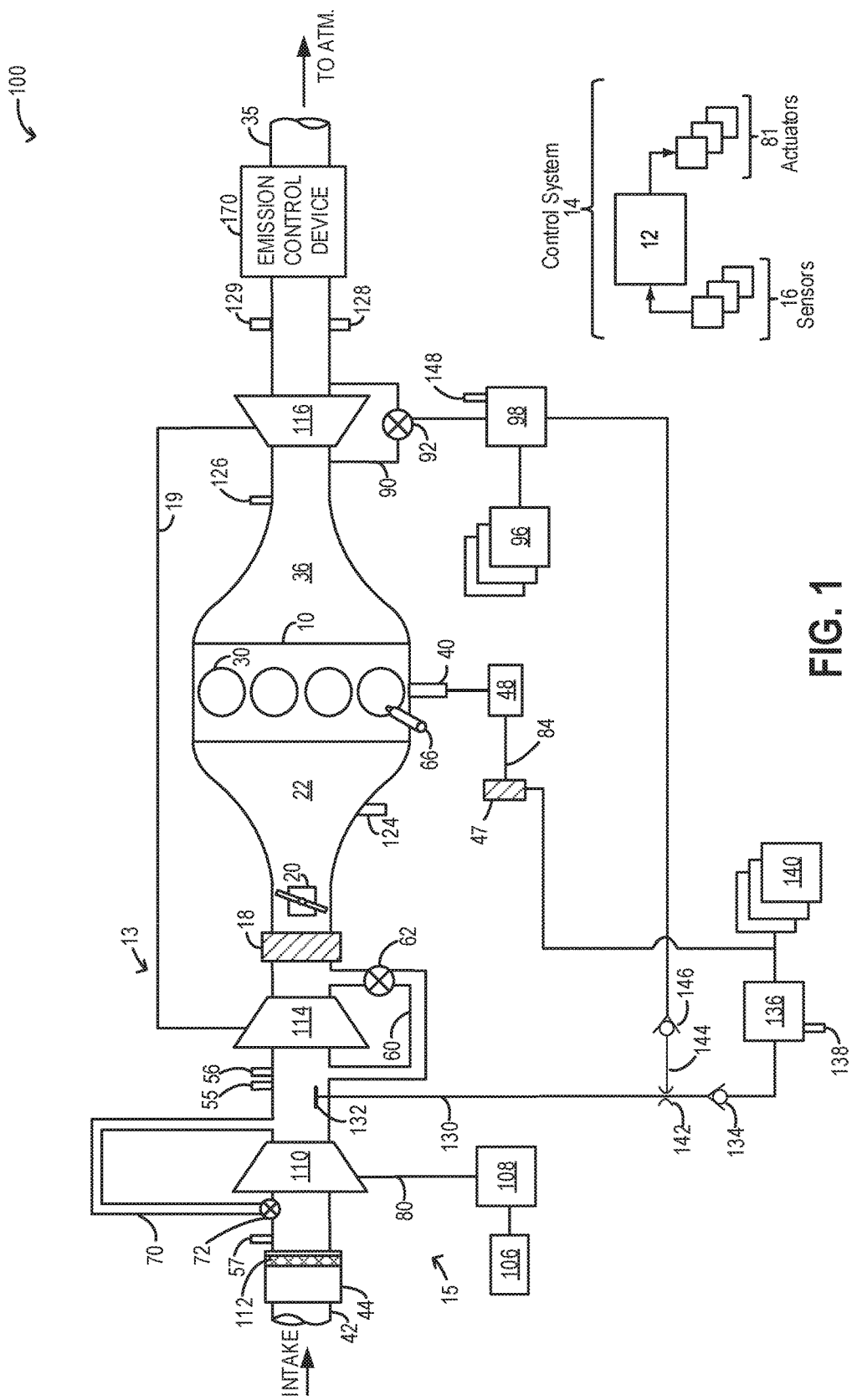
FIG. 1 shows an example embodiment of a boosted engine system having multiple staged charge boosting devices.

The following description relates to systems and methods for an engine system having staged boosting devices, such as the boosted engine system of FIG. 1 wherein a turbocharger is staged downstream of an electric supercharger. A controller may be configured to perform a routine, such as the example routines of FIGS. 2-3, to opportunistically use the electric supercharger as an on-board air pump or vacuum pump. An example electric supercharger operation is shown with reference to FIGS. 4A-4B. In this way, compressed air may be provided on-board a vehicle for purposes such as tire inflation. In addition, vacuum may be provided on-board the vehicle for purposes such as for canister purging.

FIG. 1 schematically shows aspects of an example engine system 100 including an engine 10. Engine system 100 may be included in a propulsion system such as an on-road vehicle. In one example, the on-road vehicle is a hybrid electric vehicle. In the depicted embodiment, engine 10 is a boosted engine including multiple, staged boosting devices. Specifically, engine 10 includes a first boosting device 15 staged upstream of a second boosting device 13. The configuration results in a first compressor 110 (of the first boosting device) being positioned in the engine intake passage 42 upstream of a second compressor 114 (of the second boosting device). In the present example, the first boosting device is an electric supercharger 15, while the second boosting device is a turbocharger 13.

Engine torque from engine 10 may be transferred to vehicle wheels 47 via powertrain shaft 84. Specifically, engine torque may be relayed from crankshaft 40 to transmission 48, and thereon to wheels 47. Transmission 48 may be a fixed ratio transmission including a plurality of gear ratios to allow engine 10 to rotate at a different speed than wheels 47. A clutch (not shown) may be provided between engine crankshaft 40 and transmission 48. By changing a torque transfer capacity of the clutch (e.g., an amount of clutch slippage), an amount of engine torque relayed to the wheels via the powertrain shaft may be modulated.

Fresh air is introduced along intake passage 42 into engine 10 via air box 44 including air cleaner 112. Fresh air then flows to electric supercharger 15. Electric supercharger 15 includes first compressor 110 driven by electric motor 108. Specifically, the compressor fan is driven by power received from the electric motor along supercharger compressor shaft 80. Motor 108 is powered by an on-board energy storage device, such as system battery 106. Air compressed by first compressor 110 is then delivered to second compressor 114. Fresh air received at the compressor inlet of second compressor 114 is then introduced into engine 10. During selected conditions, as elaborated below, air may bypass supercharger 15 and be directed through first compressor bypass 70 by adjusting the opening of an electric supercharger bypass valve (ESBV) 72. During these conditions, compressed air may be delivered to engine 10 via second compressor 114 of the turbocharger only. First compressor 110 of supercharger 15 may additionally be driven by the engine crankshaft, via a clutch and gear mechanism.

Turbocharger 13 includes second compressor 114 driven by a turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. During selected conditions, as elaborated below, air compressed by turbocharger 13 may be recirculated from the outlet to the inlet of compressor 114 through second compressor bypass 60 by adjusting the opening of a compressor recirculation valve (CRV) 62. CRV 62 may be a continuously variable valve and increasing the opening of the recirculation valve may include actuating (or energizing) a solenoid of the valve.

Second compressor 114 is coupled, through charge-air cooler (CAC) 18 (herein also referred to as an intercooler) to intake throttle valve 20. Intake throttle valve 20 is coupled to engine intake manifold 22. Air is received at the second compressor 114 from first compressor 110. From the second compressor 114, the compressed air charge flows through the charge-air cooler 18 and the intake throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the upstream of the staged compressors and second compressor refers to the downstream of the staged compressors. In one non-limiting example, as depicted, the first upstream compressor is a supercharger compressor while the second downstream compressor is a turbocharger compressor. However, other combinations and configurations of boosting devices may be possible.

During conditions when there is an increase in driver torque demand, such as during a tip-in, when going from engine operation without boost to engine operation with boost, turbo lag can occur. This is due to delays in turbine spin-up and reduced flow through second compressor 114 when the throttle opens at the tip-in. To reduce this turbo lag, during those selected conditions, both supercharger 15 and turbocharger 13 may be enabled. Specifically, while turbine 116 spins-up, boost pressure can be provided by the upstream supercharger compressor 110. Enabling the supercharger includes drawing energy from battery 106 to spin motor 108, to thereby accelerate first compressor 110. In addition, ESBV 72 may be closed so as to enable a larger portion of air to be compressed by first compressor 110. Then, when the turbine has sufficiently spun up, and is capable of driving second compressor 114, the second compressor may be decelerated by disabling motor 108. In addition, ESBV 72 may be opened (e.g., fully opened) so as to enable a larger portion of air to bypass first compressor 110. Further, during conditions when the increase in driver demand is small or transient, all of the boost demand may be met by operating the electric supercharger. By spinning the first compressor 110 via the electric motor 108, a rapid increase in boost pressure may be provided substantially instantaneously.

During conditions when there is a decrease in driver torque demand, such as during a tip-out, when going from engine operation with boost to engine operation without boost, or reduced boost, compressor surge can occur. This is due to a decreased flow through the second compressor 114 when the intake throttle valve 20 closes at the tip-out. The reduced forward flow through the second compressor can cause surge and degrade turbocharger performance. In addition, surge can lead to NVH issues such as undesirable noise from the engine intake system. To reduce compressor surge, at least a portion of the aircharge compressed by second compressor 114 may be recirculated to the compressor inlet via CRV 62. This allows excess boost pressure to be substantially immediately relieved. The depicted example shows recirculation passage 60 with compressor recirculation valve 62 for recirculating (warm) compressed air from the compressor outlet of second compressor 114, upstream of charge-air cooler 18, to the compressor inlet of second compressor 114. In some embodiments, the compressor recirculation system may alternatively, or additionally, include a recirculation passage for recirculating (cooled) compressed air from the compressor outlet, downstream of the charge-air cooler to the compressor inlet.

One or both of valves 62 and 72 may be continuously variable valves wherein a position of the valve is continuously variable from a fully closed position to a fully open position. Alternatively, compressor recirculation valve 62 may be a continuously variable valve while ESBV valve 72 is an on-off valve. In some embodiments, CRV 62 may be normally partially open during boosted engine operation to provide some surge margin. Herein, the partially open position may be a default valve position. Then, in response to the indication of surge, the opening of CRV 62 may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, CRV 62 may be held closed during boosted engine operation (e.g., peak performance conditions) to improve boost response and peak performance.

One or more sensors may be coupled to an inlet of second compressor 114 (as shown) and/or first compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of compressor 114 and compressor 110, for determining a composition and condition of aircharge entering the compressor. These sensors may include, for example, manifold air flow sensor 57.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through waste-gate 90, by-passing the turbine. Waste-gate actuator 92 may be actuated open to dump at least some exhaust pressure from upstream of the turbine to a location downstream of the turbine via waste-gate 90. By reducing exhaust pressure upstream of the turbine, turbine speed can be reduced.

In the depicted example, waste-gate 90 is a vacuum actuator, that is, it may be actuated via the application of vacuum. Waste-gate 90 may be coupled to vacuum source 98. In one example, vacuum source 98 is a vacuum canister (or other vacuum storage device). Specifically, waste-gate actuation is achieved using vacuum from vacuum source 98. As such, the engine may include one or more additional vacuum actuators 96 that are actuated using vacuum from vacuum source 98. The one or more additional vacuum actuators 96 may include, for example, a brake booster for braking vehicle wheels, a canister purge valve for purging fuel vapors from a fuel system canister, a crankcase ventilation valve, auxiliary systems, etc. A vacuum sensor 148 may be coupled to the vacuum source 98 for estimating an amount of vacuum available for actuating the various vacuum actuators and waste-gate. Alternatively, the vacuum level may be inferred based on engine operating conditions and actuator usage.

The combined flow from the turbine and the waste-gate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 110, second compressor 114, or both.

In addition to using electric supercharger 15 for providing a transient boost pressure, the supercharger may be advantageously used as an on-board air pump and/or vacuum pump. As a result, the supercharger may be provide a reliable, on-board source of compressed air for one of more vehicle components including components external to engine 10. For example, compressed air may be used for inflating tires of wheels 47, or for providing air to an air suspension system of the vehicle. As another example, vacuum generated by the supercharger may be used to replenish vacuum source 98. During conditions when engine 10 is idling and the vehicle is stopped (not being propelled), each of ESBV 72 and throttle 20 may be closed, sealing a portion of intake passage 42 from immediately upstream of first compressor 110 to immediately downstream of second compressor 114. Throttle 20 may be fully closed during conditions when the engine is shutdown. Alternatively, when the engine is idling, the intake throttle may be opened just enough to keep the engine running. In other examples, such as where the engine includes an idle control valve, the intake throttle may be fully closed while the idle control valve is opened so that sufficient air is delivered to the engine to keep the engine idling. As such, during engine idling conditions, each of first compressor 110 and second compressor 114 may not be spinning. The controller may selectively operate electric supercharger 15 to deliver compressed air into the sealed portion of the intake passage. The sealed portion may be coupled to a pressurized air pick-up line 130 via a pick-up valve 132. Pick-up valve 132 may be opened to store compressed air in pressure storage device 136 for later use. In addition, pick-up valve 132 enables the pick-up port to be sealed, thereby preventing leakage of compressed air during regular electric supercharger operation. Alternatively compressed air may be directly used for one or more compressed air consuming devices 140, such as for inflating tires of wheels 47. A pressure sensor 138 may be coupled to the pressure storage device 136 for estimating an amount of positive pressure available for operating the various compressed air consuming devices 140. Alternatively, the pressure level may be inferred based on engine operating conditions and actuator usage. A check valve 134 may also be included in pressurized air pick-up line 130 to prevent back-flow when pressure in the sealed portion of the intake passage is not sufficiently higher than the consuming devices 140.

If vacuum is required, such as when vacuum source 98 needs to be replenished, at least a portion of the compressed air drawn from the sealed portion of the intake passage may be diverted through ejector 142. Due to the Bernoulli effect, vacuum is generated at the neck of the ejector due to the air flow through the ejector. Vacuum drawn at the neck of the ejector 142 is then directed to vacuum source 98, and optionally to vacuum actuators 96, via vacuum line 144. A check valve 146 may also be included in vacuum line 144 to prevent back-flow.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, MAF sensor 57, pressure sensor 138, and vacuum sensor 148. Other sensors such as additional pressure, temperature, air/fuel ratio, and composition sensors may be coupled to various locations in engine system 100. The actuators 81 may include, for example, throttle 20, compressor recirculation valve 62, electric motor 108, waste-gate actuator 92, ESBV 72, pick-up valve 132, and fuel injector 66. The control system 14 may include a controller 12. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 2-3. As one example, the controller may send a duty cycle signal to the electric motor to spin the first compressor of the electric supercharger at a speed that outputs a desired boost pressure. As another example, the controller may send a signal to the waste-gate valve actuator to increase or decrease the opening of the waste-gate valve to accordingly decrease or increase the rotation speed of the exhaust turbine driving the second compressor of the turbocharger.

Figure 2:
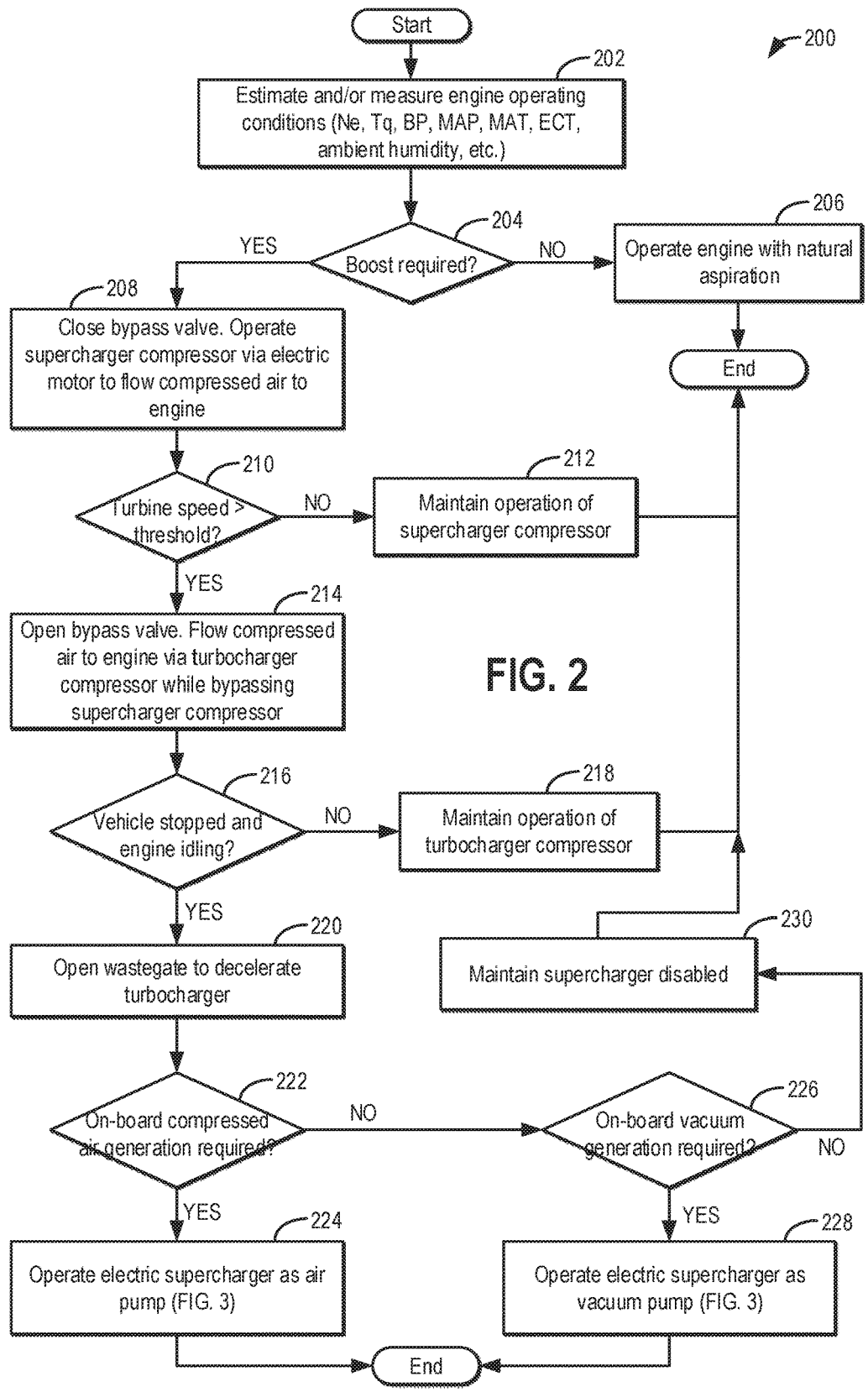
FIG. 2 shows a high level flowchart illustrating a routine that may be implemented to operate a boosted engine system including an electric supercharger and a turbocharger.

Turning now to FIG. 2, an example routine 200 is shown for operating a compressor of an upstream boosting device (e.g., an electric supercharger) during selected conditions to provide a transient boost response and during other conditions to provide a reliable on-board source of compressed air and/or vacuum. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating engine operating conditions, such as engine speed, pedal position, operator torque demand, ambient conditions (ambient temperature, pressure, humidity), engine temperature, etc. At 204, the method includes determining if boost is required. In one example, boost may be required at mid-high engine loads. In another example, boost may be required in response to an operator pedal tip-in or increase in driver torque demand. If boost is not required, such as when the engine load is low or the driver torque demand is low, the method moves to 206 wherein the engine is operated with natural aspiration.

If boost is required, then at 208, the method includes, closing a bypass valve coupled to a first, upstream compressor of an electric supercharger and operating the first compressor while a turbine coupled to a second, downstream compressor spins up. The bypass valve, herein also referred to as the electric supercharger bypass valve (ESBV) may be coupled to a bypass passage across the supercharger. By opening the ESBV, a larger portion of air drawn in via an intake passage may be directed through the first compressor of the electric supercharger. In one example, the controller may send a signal to an actuator of the ESBV to transition the ESBV to a fully open position. In response to an increase in driver demanded torque, the first compressor is accelerated and a flow of compressed air to the engine from the first compressor is increased. Herein the first compressor is staged upstream of the second compressor along an air intake passage. Further, the first compressor is driven by an electric motor while the second compressor is driven by an exhaust turbine. Herein, operating the first compressor includes spinning the first compressor via the electric motor using power drawn from a battery. For example, a controller may send a duty cycle signal to an electromechanical actuator coupled to an electric motor of the supercharger to rotate the motor at a higher speed, thereby spinning the first compressor via the electric motor. The duty cycle signal sent to the electric motor may be determined as a function of the requested boost. For example, as the demanded boost pressure increases, the duty cycle commanded to the electric motor may be increased to increase the rotation speed of the electric motor, and thereby the first compressor. Thus at this time, compressed air is provided to the engine via only the first compressor. As such, electric superchargers may have a response time (that is, idle to 100% duty cycle) of 130-200 ms and therefore may be able to deliver boost much faster compared to a typical turbocharger response time (1-2 second). Therefore, the first compressor of the electric supercharger may be able to fill the turbo lag significantly faster.

In one example, the controller adjusts the output of the first compressor of the electric supercharger based on the boost demand. For example, the controller may determine a control signal to send to the electric motor actuator, such as a duty cycle or rotation speed signal being determined based on a determination of the boost demand. The duty cycle may correspond to a rotation speed of the electric motor that provides a target boost pressure at the outlet of the first compressor. The boost demand may be based on the operator torque demand. The controller may determine the duty cycle signal through a determination that directly takes into account the boost demand, such as increasing the duty cycle with increasing boost demand. The controller may alternatively determine the duty cycle based on a calculation using a look-up table with the input being boost demand and the output being a duty cycle signal to be commanded to the electric motor. As another example, the controller may make a logical determination (e.g., regarding a rotation speed of the electric motor) based on logic rules that are a function of boost demand. The controller may then generate a control signal that is sent to the electric motor.

As exhaust heat and pressure develops due to cylinder combustion, the exhaust turbine speed increases, driving the second compressor. At 210, it is determined if the turbine speed is higher than a threshold, such as above a threshold speed where the turbocharger is able to sustain the boost demand. If not, operation of the first compressor (of the supercharger) is maintained at 212.

If turbine speed is higher than the threshold, then at 214, the method includes decelerating the first compressor by disabling the electric motor, for example based on a signal sent from the controller to an electromechanical actuator of the motor that reduces motor rotation speed. Additionally, the ESBV may be opened allowing air received in the intake passage to flow to engine via the downstream turbocharger compressor, while bypassing the upstream supercharger compressor. Specifically, an electromechanical actuator coupled to the bypass valve in the bypass across the first compressor may be adjusted to rotate the bypass valve to a more open position based on a control signal from the controller to the actuator. Thus, after the turbine has spun up sufficiently, the method includes bypassing the first compressor and providing a flow of compressed air to a piston engine via the second compressor. Herein, compressed air is not provided to the engine via the first compressor. In this way, by transiently operating the first compressor of the electric supercharger until the turbocharger turbine is spun up, turbo lag due to delays in spinning up the second compressor are reduced.

At 216, the method includes confirming that the vehicle engine is idling and the vehicle is stopped. In one example, the vehicle may be stopped with the engine idling at a traffic signal or in a garage. If the vehicle engine is not idling or the vehicle is not stopped, then at 218, the method includes continuing to operate the turbocharger compressor to meet boost demand while operating the supercharger compressor, as required, to meet transient boost demand. In an alternate example, it may be confirmed that the engine is shut down.

Upon confirming that the vehicle engine is idling (or shutdown) and the vehicle is stopped, at 220, the method includes increasing an opening of the exhaust waste-gate valve to decelerate the turbocharger. In one example, the exhaust waste-gate valve is fully opened to increase the portion of exhaust that bypasses the turbine, thereby decelerating the turbine.

At 222, the method includes determining if on-board compressed air generation is required. In one example, on-board compressed air generation may be required if a level of compressed air in an on-board compressed air storage device is below a threshold. The level of compressed air in the on-board compressed air storage device may be determined based on the output of a pressure sensor coupled to the compressed air storage device. Alternatively the level of compressed air in the on-board compressed air storage device may be inferred based on engine operating conditions and rate of usage compressed air consuming devices. In one example, on-board compressed air generation is required if an air pressure in the tires (of the vehicle wheels) is below a target pressure. In another example, on-board compressed air generation is required if an air pressure in the vehicle air suspension system is below a target pressure.

If on-board compressed air generation is required, then at 224, the method includes operating the first compressor of the electric supercharger as an on-board air pump. As elaborated with reference to FIG. 3, this includes closing the ESBV and an intake throttle to seal a portion of the intake passage, and selectively operating the first compressor of the electric supercharger to deliver compressed in the sealed portion. Compressed air may then be picked up from the sealed portion via a pressurized pick-up line and delivered to the one or more compressed air consuming devices including devices external to the vehicle engine.

If on-board compressed air generation is not required, at 226, it may be determined if on-board vacuum generation is required. In one example, on-board vacuum generation may be required if a level of vacuum in an on-board vacuum storage device or vacuum source is below a threshold. The level of vacuum in the on-board vacuum source/storage device may be determined based on the output of a vacuum sensor coupled to the vacuum storage device. Alternatively the level of vacuum in the on-board vacuum storage device may be inferred based on engine operating conditions and rate of usage vacuum consuming actuators. In one example, on-board vacuum generation is required if a vacuum available in a brake booster master cylinder is below a target pressure. In another example, on-board compressed air generation is required if there is insufficient vacuum available for purging a fuel vapor canister or for ventilation a crankcase.

If neither on-board vacuum generation nor on-board compressed air generation is required, the method returns to 230 to maintain the supercharger disabled.

If on-board vacuum generation is required, then at 228, the method includes operating the first compressor of the electric supercharger as an on-board air pump. As elaborated with reference to FIG. 3, this includes closing the ESBV and an intake throttle to seal a portion of the intake passage, and selectively operating the first compressor of the electric supercharger to deliver compressed in the sealed portion. Compressed air may then be picked up from the sealed portion via a pressurized pick-up line and flowed through an ejector. Vacuum generated at the ejector is then delivered to the one or more vacuum consuming devices including engine vacuum actuators.

It will be appreciated that while the above example suggests operating the supercharger as an on-board air pump when compressed air generation is required or as a vacuum pump when vacuum generation is required, in still other examples, the supercharger may be operated as an air pump or vacuum pump opportunistically, whenever the engine is idling and the vehicle is not moving. The opportunistic operation enables on-board vacuum and compressed air sources to be continually and opportunistically replenished.

Figure 3:
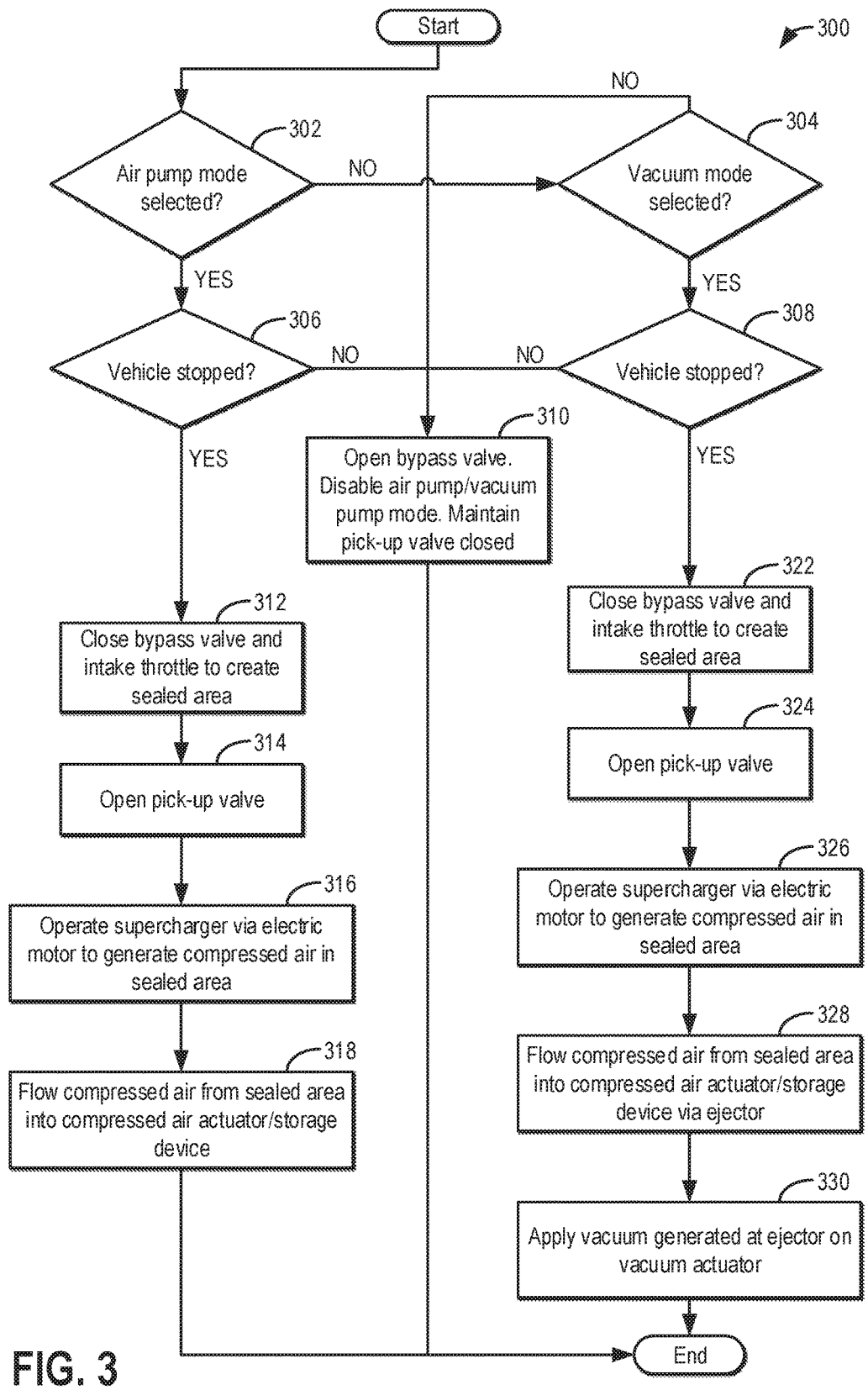
FIG. 3 shows a flowchart illustrating a routine that may be implemented to operate an electric supercharger as an on-board air pump or vacuum pump.

Turning now to FIG. 3, an example method 300 is shown for operating a compressor of an upstream boosting device (e.g., an electric supercharger) during selected conditions as an on-board air pump and/or vacuum pump. In one example, method 300 may be performed as part of the method of FIG. 2, such as at 224 and 228. The controller may employ engine actuators of the engine system to adjust engine operation, according to the methods described below.

At 302, the method includes confirming if an air pump mode of operating the electric supercharger has been selected. In one example, the air pump mode may be selected when on-board compressed air generation is required, such as for inflating vehicle tires. If the air pump mode is selected, at 306, it may be confirmed that the vehicle is stopped and further it may be confirmed that the engine is shutdown or idling. If the vehicle is not stopped, then at 310, the method includes fully opening the bypass valve coupled to the electric supercharger to bypass air flow through the supercharger. In addition, the electric motor coupled to the electric supercharger compressor may be disabled to disable the air pump and vacuum pump mode. Furthermore, a pick-up valve coupling the intake passage to a pressurized air pick-up line is held closed so as to reduce leakage of boost pressure via the pick-up port.

If the air pump mode is not confirmed at 302, then at 304, the method includes confirming if a vacuum pump mode of operating the electric supercharger has been selected. In one example, the vacuum pump mode may be selected when on-board vacuum generation is required, such as for operating vacuum actuators. If the vacuum pump mode is selected, at 308, it may be confirmed that the vehicle is stopped and further it may be confirmed that the engine is idling or shutdown. If the vehicle is not stopped, then at 310, the method includes fully opening the bypass valve coupled to the electric supercharger to bypass air flow through the supercharger. In addition, the electric motor coupled to the electric supercharger compressor may be disabled to disable the air pump and vacuum pump mode. If the vacuum pump mode is not selected, the method also moves to 310 to disable the air pump and vacuum pump mode.

If the air pump mode is selected and the conditions for operating in the air pump mode are confirmed (that is, during engine idling and while the vehicle is not propelled), then at 312 the method includes sealing a portion of an intake passage by closing each of an intake throttle and a bypass valve coupled to the electric supercharger (the ESBV). For example, the controller may send a control signal to an actuator of the intake throttle to move the throttle to a fully closed position. Likewise, the controller may send a control signal to an actuator of ESBV to move the bypass valve to a fully closed position. It will be appreciated that the intake throttle may be fully closed if the engine is shutdown. If the engine is idling, the intake throttle may be almost fully closed but opened just enough to allow the engine to idle. Alternatively, if the engine includes an idle control valve bypass the intake throttle, when the engine is idling, the intake throttle may be fully closed while the idle control valve is opened to enable the engine to idle (and avoid an engine stall).

At 314, the method includes opening a pick-up valve coupling the sealed portion of the intake passage to a pressurized air pick-up line. The controller may send a signal actuating the pick-up valve to a fully open position. At 316, the method includes operating the electric supercharger to generate compressed air in the sealed portion of the intake passage. The electric supercharger may be coupled upstream of a turbocharger, the electric supercharger including a first compressor driven by an electric motor, the turbocharger including a second compressor driven by an exhaust turbine, the second compressor positioned downstream of the first compressor in the intake passage. The intake throttle may be coupled in the intake passage, downstream of the second compressor. Operating the supercharger may include spinning the first compressor via the electric motor operating at a full duty cycle while a waste-gate valve coupled across the exhaust turbine is held open. For example, the controller may send a signal corresponding to a full duty cycle to the electric motor to spin the electric motor at the fully duty cycle, thereby spinning the first compressor of the electric supercharger at a highest speed setting.

At 318, the method includes flowing (or drawing) the compressed air from the sealed portion into a device. For example, the compressed air may be supplied to one or more of a compressed air actuator and a vehicle component such as to vehicle tires and a vehicle air suspension system. In one example, the compressed air may be supplied for inflating vehicle tires. In another example, the compressed air may be supplied for replenishing air in a vehicle suspension. The compressed air may be applied via the pressurized air pick-up line. Further, the compressed air may be stored in a pressurized air source for later use.

It will be appreciated that if air flow out of the compressor operating as an air pump is smaller than a threshold amount, the controller may increase (e.g., intermittently) the opening of the bypass valve to recirculate at least a portion of the flow so that the supercharger compressor does not go into surge.

If the vacuum pump mode is selected and the conditions for operating in the vacuum pump mode are confirmed (that is, during engine idling and while the vehicle is not propelled), then at 322, the method includes sealing a portion of an intake passage by closing each of an intake throttle and a bypass valve coupled to the electric supercharger (the ESBV). For example, the controller may send a control signal to an actuator of the intake throttle to move the throttle to a fully closed position. Likewise, the controller may send a control signal to an actuator of ESBV to move the bypass valve to a fully closed position. It will be appreciated that the intake throttle may be fully closed if the engine is shutdown. If the engine is idling, the intake throttle may be almost fully closed but opened just enough to allow the engine to idle. Alternatively, if the engine includes an idle control valve bypass the intake throttle, when the engine is idling, the intake throttle may be fully closed while the idle control valve is opened to enable the engine to idle (and avoid an engine stall).

At 324, the method includes opening a pick-up valve coupling the sealed portion of the intake passage to a pressurized air pick-up line. The controller may send a signal actuating the pick-up valve to a fully open position. At 326, the method includes operating the electric supercharger to generate compressed air in the sealed portion of the intake passage. The electric supercharger may be coupled upstream of a turbocharger, the electric supercharger including a first compressor driven by an electric motor, the turbocharger including a second compressor driven by an exhaust turbine, the second compressor positioned downstream of the first compressor in the intake passage. The intake throttle may be coupled in the intake passage, downstream of the second compressor. Operating the supercharger may include spinning the first compressor via the electric motor operating at a full duty cycle while a waste-gate valve coupled across the exhaust turbine is held open. For example, the controller may send a signal corresponding to a full duty cycle to the electric motor to spin the electric motor at the fully duty cycle, thereby spinning the first compressor of the electric supercharger at a highest speed setting.

At 328, the method includes flowing (or drawing) the compressed air from the sealed portion into a device via the pressurized air pick-up line through an ejector coupled to the device to generate vacuum. Flow of compressed air through the ejector in the pressurized air pick-up line generates vacuum at a neck of the ejector. At 330, the method includes applying the generated vacuum to an engine vacuum actuator. For example, the vacuum may be supplied to one or more of a waste-gate valve, a canister purge valve, and a crankcase ventilation valve. Further, the vacuum may be stored in a vacuum source for later use.

It will be appreciated that while operating the supercharger in the air pump mode or the vacuum pump mode, responsive to one of an increase in driver torque demand and a demand for vehicle propulsion, the controller may discontinue the air pump or vacuum pump mode and resume operating the supercharger, as required, to transiently provide boost pressure. For example, responsive to a sudden boost demand, the controller may send a signal to open the throttle while maintaining the bypass valve closed. In addition, the controller may send a signal to a waste-gate actuator to close the waste-gate valve. The controller may then operate the supercharger to flow air compressed by the first compressor to the engine until the turbine speed is higher than a threshold. Operating the supercharger responsive to the increase in driver torque demand or the demand for vehicle propulsion may include adjusting a duty cycle of the electric motor based on the demand, the duty cycle increased to or towards the full duty cycle as the demand increases. Then, after the turbine speed is higher than the threshold, the controller may send a signal to fully open the bypass valve and flow air compressed by the second (turbocharger) compressor to the engine while bypassing the first compressor.

In this way, in response to engine idling while a vehicle is stopped, a controller may close each of an intake throttle and a bypass valve to seal a portion of an intake passage housing each of an upstream compressor and a downstream compressor and selectively operate only the upstream compressor. During a first condition, the controller may draw compressed air from the sealed portion, bypassing an ejector, and apply the compressed air to a first vehicle actuator. In comparison, during a second condition, the controller may draw compressed air from the sealed portion via the ejector, and apply vacuum generated at the ejector to a second, different vehicle actuator. In one example, during the first condition, a pressure level of a pressure storage device coupled to the first vehicle actuator may be lower than a threshold pressure, while during the second condition, a vacuum level of a vacuum storage device coupled to the second vehicle actuator may be lower than a threshold vacuum. One or more of the first vehicle actuator and the second vehicle actuator may be external to the engine. For example, the first vehicle actuator may include one of vehicle tires and vehicle air suspensions. The upstream compressor may be a compressor of an electric supercharger while the downstream compressor may be a compressor of a turbocharger. Selectively operating only the upstream compressor may include spinning the upstream compressor via the electric motor, the electric motor operating at a full duty cycle.

Figure 4B:
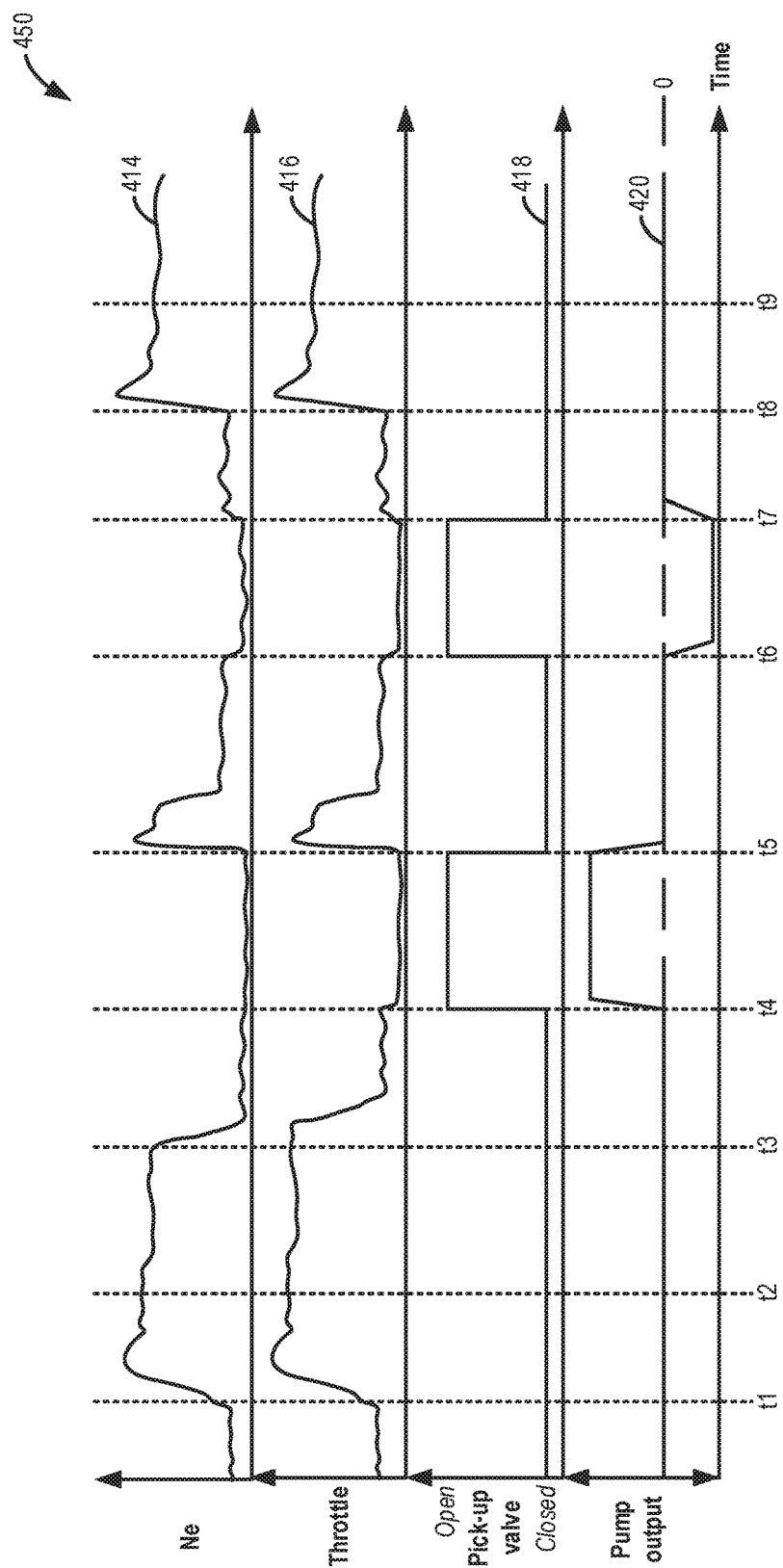

Turning now to FIGS. 4A-4B, an example timeline of operation of an electric supercharger for boost control as well as for on-board generation of compressed air and vacuum is shown at example maps 400 and 450. The horizontal axis (x-axis) denotes time and the vertical markers t1-t9 identify significant times for supercharger operation. Plot 402 shows variation in an accelerator pedal position over time. Plot 404 shows variation in boost pressure over time. Plot 406 shows variation of a turbocharger turbine speed over time. Plot 408 shows changes in the position of an electric supercharger bypass valve (ESBV) coupled across the electric supercharger. The ESBV is opened to allow intake air to bypass the electric supercharger or closed to direct air through the electric supercharger. Plot 410 shows variation of an electric supercharger compressor speed (Comp_ES). Plot 412 shows variation of a turbocharger compressor speed (Comp_TC). Plot 414 shows changes in an engine speed (Ne). Plot 416 shows changes in the opening of an intake throttle. Plot 418 shows changes in the position of a pick-up valve coupling the intake passage (downstream of the supercharger compressor and upstream of the turbocharger compressor) to a pressurized air pick-up line. When the pick-up valve is opened, air flows from the intake passage into the pressurized air pick-up line. Plot 420 shows changes in the output of the electric supercharger when operating as an on-board air or vacuum pump. In the present example, the ES compressor is positioned upstream of the TC compressor in the intake passage. Further, the ESBV is located in the intake passage upstream of the ES compressor while the intake throttle is positioned downstream of the TC compressor in the intake passage. The pick-up valve is located downstream of the ES compressor and upstream of the TC compressor in the intake passage.

Prior to time t1, the engine is operating without boost (plot 404) due to a lower driver demand (plot 402). At this time, the engine speed (plot 414) is in a low speed region (e.g., just above idling) and the intake throttle (plot 416) is open by a small amount to provide the desired engine speed-load profile. An exhaust waste-gate is maintained open since exhaust flow through the turbocharger turbine is not required, and therefore the turbocharger compressor is not spinning (plot 412). In addition, the electric supercharger (ES) is not operated (plot 410) and the ESBV is opened (plot 408) so that intake airflow bypasses the ES. The pick-up valve is closed (plot 418) since the supercharger is not being operated as an air pump or a vacuum pump, and therefore the pump output is zero (plot 420).

At time t1, the operator tips in, moving the engine from engine operation with natural aspiration to engine operation with boost. In response to the tip-in, throttle opening is increased to meet the increased air flow demand. The increased air flow and corresponding fuel usage results in an increase in engine speed. The engine boost pressure is increased in response to the pedal tip-in event by actuating an electric motor coupled to the supercharger compressor to increase the electric supercharger compressor speed. A duty cycle delivered to the electric motor of the supercharger may be increased so as to accelerate the supercharger compressor. At the same time, the ESBV is closed to route more air through the supercharger compressor. Also at the same time, a waste-gate opening is reduced (not shown) to flow more exhaust through the turbocharger turbine and expedite turbine spin-up. By operating the smaller electric supercharger compressor in response to the pedal tip-in event, the boost pressure can be rapidly increased to meet the driver demand while the turbine spins up. Between t1 and t2, intake air compressed by only the upstream supercharger compressor is delivered to the engine to meet the boost demand.

At t2, the turbine reaches a threshold speed 407 above which the turbine is able to drive the turbocharger compressor and the turbocharger (TC) compressor is able to meet the driver demanded boost pressure. Accordingly at t2, the turbocharger compressor speed starts to increase. Also at t2, the ESBV is opened to route more air through the turbocharger compressor while bypassing the supercharger compressor. In addition, a duty cycle delivered to the electric motor of the supercharger may be decreased so as to decelerate the supercharger compressor. At this time, intake air compressed by only the downstream turbocharger compressor is delivered to the engine to meet the boost demand. As such, if the electric supercharger compressor were not spun, due to the delay in turbine spin-up, there may have been a turbo lag (delay in the actual boost pressure reaching the desired boost pressure), as depicted at dashed plot 405. In particular, by operating the electric supercharger (ES), the desired boost pressure is provided by t2, in comparison to the turbo lag case where the desired boost pressure is provided around t3.

It will be appreciated that between t1 and t3, when boost pressure is delivered via the ES or the TC, the pick-up valve is held closed so as to prevent leakage of boost pressure from the intake passage into a pressurized air pick-up line. Also, since the supercharger is not being operated as an air pump or a vacuum pump, the pump output remains zero at this time.

It will be appreciated that while the ESBV is depicted as an on/off valve movable between a fully open and a fully closed position, in an alternate example, the ESBV may be a variable valve whose position is adjustable to any position between and including the fully opened and fully closed positions. In such a case, the ESBV opening may be decreased responsive to the boost demand so that a specific amount of airflow may flow through the electric supercharger, such that a resultant boost pressure is equivalent to the desired boost pressure. A duty cycle may be commanded to the of the electric motor to provide a motor speed that corresponds to a supercharger compressor speed that provides a boost pressure matching the desired boost pressure.

At t3, there is a drop in driver demand. The throttle opening is reduced responsive to the reduced driver demand, and the engine moves to an idling speed. To reduce boost pressure, a waste-gate valve is opened to decelerate the exhaust turbine and thereby decelerate the turbocharger compressor. The ESBV is maintained open and the ES compressor remains disabled since there is no transient boost demand to be met. Between t3 and t4, the vehicle stops moving. As an example, between t3 and t4, the vehicle may be stopped at a traffic signal with the engine idling.

At t4, conditions for operating the ES as an on-board air or vacuum pump are considered met. Based on tire pressure, it may be determined that compressed air is required for tire inflation and that a vacuum source is sufficiently full. Therefore at t4, the ES is operated in an air pump mode (and not a vacuum pump mode). To operate the ES in an air pump mode, at t4, the ESBV is fully closed. At the same time, the intake throttle is almost fully closed, with just enough valve opening left to provide sufficient air to keep the engine running. By fully closing the bypass valve and almost fully closing the intake valve, a section of the intake passage from upstream of the ES compressor to downstream of the TC compressor is substantially sealed. A signal corresponding to a full duty cycle is commanded to the electric motor to accelerate the ES compressor at a highest speed setting possible. As a result of the increase in ES rotation, compressed air is generated in the sealed junction. The increased "air pump" output is shown at plot 420. The pick-up valve is opened so that the compressed air can be delivered to the tires for inflation, as well as to any other compressed air consuming devices.

In the present example, the ES rotation is continued opportunistically until t5 while the engine is idling and the vehicle is not moving. Any positive air pressure generated in excess of the pressure required to inflate the tires may be stored in a positive pressure storage device. At t5, responsive to a transient increase in torque demand, such as due to a demand for vehicle launch and propulsion, while holding the ESBV closed, the intake throttle may be opened and the ES may be operated to compress air for meeting the transient boost pressure demand. As a result, the air pump mode is disabled. Herein the boost demand may be a transient demand that is met via the ES only, and without requiring the TC to be enabled. A duty cycle commanded to the electric motor at t5 may be different from the duty cycle commanded to the electric motor at t4. For example, a higher duty cycle (e.g., maximum possible duty cycle) may be commanded to the electric motor at t4 when operating the ES as an air pump. In comparison, at t5, the commanded duty cycle may be a duty cycle that is adjusted as a function of the boost demand. Following the transient boost demand, when the torque demand drops, the ESBV may be opened and the ES compressor may be decelerated. The engine may then resume operation with natural aspiration.

It will be appreciated that in an alternate example, when operating the ES in the air pump mode, once the tires are sufficiently inflated and the compressed air demand is met (such as in between t4 and t5), the ESBV may be opened (as shown at dashed segment 409) and the ES compressor allowed to decelerate. Then, responsive to the transient boost demand at t5, the ESBV may be closed again and the ES compressor may be accelerated via the electric motor to provide the requested boost pressure.

Between t5 and t6, there is a drop in driver demand. The throttle opening is reduced responsive to the reduced driver demand, and the engine moves to an idling speed. To reduce boost pressure, a waste-gate valve is opened to decelerate the exhaust turbine and thereby decelerate the turbocharger compressor. The ESBV is maintained open and the ES compressor remains disabled since there is no transient boost demand to be met. Also between t5 and t6, the vehicle stops moving. As an example, between t5 and t6, the vehicle may be stopped at a traffic signal with the engine idling.

At t6, conditions for operating the ES as an on-board air or vacuum pump are considered met. Based on tire pressure, it may be determined that compressed air is not required for tire inflation. Based on prior vacuum actuator operation, it may be determined that the vacuum source needs to be replenished. Therefore at t6, the ES is operated in a vacuum pump mode (and not in the air pump mode). To operate the ES in the vacuum pump mode, at t6, ea the ESBV is fully closed. At the same time, the intake throttle is almost fully closed, with just enough valve opening left to provide sufficient air to keep the engine running. By fully closing the bypass valve and almost fully closing the intake throttle, a section of the intake passage from upstream of the ES compressor to downstream of the TC compressor is substantially sealed. A signal corresponding to a full duty cycle is commanded to the electric motor to accelerate the ES compressor at a highest speed setting possible. As a result of the increase in ES rotation, compressed air is generated in the sealed junction. The pick-up valve is opened and the compressed air is routed through an ejector in the pressurized air pick-up line, causing vacuum to be generated at the ejector neck. The increased "vacuum pump" output is shown at plot 420. The generated vacuum is then supplied to the vacuum source for replenishment as well as applied to any engine vacuum actuators, as required. For example, the generated vacuum may be used for waste-gate actuation, fuel vapor canister purging, etc.

In the present example, the ES rotation is continued opportunistically until t7 while the engine is idling and the vehicle is not moving. At t7, responsive to a transient increase in torque demand, but not high enough for boost to be required, the intake throttle may be opened. In addition, the ESBV may be opened to direct air flow to the engine, bypassing the ES. In addition, the ES may be decelerated. As a result, the vacuum pump mode is disabled.

At t8, responsive to a larger increase in torque demand, the ES may be operated to compress air for meeting the transient boost pressure demand while the turbine spins up. As between t1 and t3, a duty cycle delivered to the electric motor of the supercharger is increased so as to accelerate the supercharger compressor. At the same time, the ESBV is closed to route more air through the supercharger compressor. Also at the same time, a waste-gate opening is reduced (not shown) to flow more exhaust through the turbocharger turbine and expedite turbine spin-up. By operating the smaller electric supercharger compressor in response to the pedal tip-in event, the boost pressure can be rapidly increased to meet the driver demand while the turbine spins up. At t9, once the turbine reaches threshold speed 407, the turbocharger (TC) compressor is able to meet the driver demanded boost pressure. Accordingly at t2, the ESBV is opened to route more air through the turbocharger compressor while bypassing the supercharger compressor. In addition, a duty cycle delivered to the electric motor of the supercharger may be decreased so as to decelerate the supercharger compressor. After t9, intake air compressed by only the downstream turbocharger compressor is delivered to the engine to meet the boost demand.

In this way, during a first vehicle moving condition, a controller may operate an upstream compressor with an intake throttle open and a bypass valve coupled to only the upstream compressor closed to supply compressed air to an engine while a downstream compressor spins up. In comparison, during a second vehicle stopped condition, the controller may operate the upstream compressor with each of the intake throttle and the bypass valve closed to supply compressed air to a sealed portion of an intake passage while the downstream compressor is disabled. Further, during the second condition, the controller may draw compressed air from the sealed portion of the intake passage and supply the compressed air to a vehicle component external to the engine. Further, during the second condition, the controller may draw compressed air from the sealed portion of the intake passage into a storage device via an ejector to generate vacuum at the ejector, and supply the vacuum generated at the ejector to an engine vacuum actuator. In one example, the upstream compressor is coupled to an electric motor and the downstream compressor is coupled to an exhaust turbine, and operating the upstream compressor during the first condition includes spinning the compressor via the motor operating at motor speed based on driver torque demand while operating the upstream compressor during the second condition includes spinning the compressor via the motor operating at a maximum possible motor speed. Further, during the first condition, a waste-gate valve coupled across the exhaust turbine is closed, while during the second condition, the waste-gate valve coupled across the exhaust turbine is open. Further, an engine speed during the first condition may be above idling speed while during the second condition, the engine speed is at idling speed. Furthermore, during the first condition, after the downstream compressor spins up, the controller may open the bypass valve to supply compressed air to the engine from the downstream compressor while bypassing the upstream compressor.

In this way, by operating an electric supercharger, staged upstream of a turbocharger, as an on-board air or vacuum pump, a reliable air and vacuum source is provided with cost reduction benefits. The technical effect of including an ejector in a pressurized pick-up line coupled to an intake passage, downstream of the supercharger, is that the same components can be leveraged for compressed air and vacuum generation. By compressing air into a sealed portion of the intake passage, engine and vehicle performance is not affected. By coupling the sealed portion of the intake passage to the pressurized pick-up line via a valve, the pick-up port may be sealed to reduce air leakage during regular boosted engine operation. Overall, a higher degree of freedom is provided to control and manage vacuum resources and compressed air resources.

As one example embodiment, a method comprises: during engine idling and while a vehicle is not propelled, sealing a portion of an intake passage by closing each of an intake throttle and a bypass valve coupled to an electric supercharger; operating the supercharger to generate compressed air in the sealed portion; and drawing the compressed air from the sealed portion into a device. In the preceding example, additionally or optionally, the method further comprises applying the compressed air to one or more of a compressed air actuator and a vehicle component including vehicle tires and a vehicle air suspension system. In any or all of the preceding examples, additionally or optionally, the compressed air is applied via a pressurized air pick-up line, and wherein applying the compressed air includes actuating a pick-up valve to an open position, the pick-up valve coupling the pressurized air pick-up line to the sealed portion of the intake passage. In any or all of the preceding examples, additionally or optionally, the method further comprises flowing the compressed air through an ejector coupled to the device to generate vacuum, and applying the generated vacuum to an engine vacuum actuator, the engine vacuum actuator including one or more of a waste-gate valve, a canister purge valve, and a crankcase ventilation valve. In any or all of the preceding examples, additionally or optionally, the electric supercharger is coupled upstream of a turbocharger, the electric supercharger including a first compressor driven by an electric motor, the turbocharger including a second compressor driven by an exhaust turbine, the second compressor positioned downstream of the first compressor in the intake passage. In any or all of the preceding examples, additionally or optionally, the intake throttle is coupled in the intake passage, downstream of the second compressor. In any or all of the preceding examples, additionally or optionally, operating the supercharger includes spinning the first compressor via the electric motor operating at a full duty cycle while a waste-gate valve coupled across the exhaust turbine is opened. In any or all of the preceding examples, additionally or optionally, the method further comprises, responsive to one of an increase in driver torque demand and a demand for vehicle propulsion, opening the throttle while maintaining the bypass valve closed, closing the waste-gate valve, and operating the supercharger to flow air compressed by the first compressor to the engine until turbine speed is higher than a threshold. In any or all of the preceding examples, additionally or optionally, operating the supercharger responsive to one of the increase in driver torque demand and the demand for vehicle propulsion includes adjusting a duty cycle of the electric motor based on the demand, the duty cycle increased to or towards the full duty cycle as the demand increases. In any or all of the preceding examples, additionally or optionally, the method further comprises, after turbine speed is higher than the threshold, opening the bypass valve and flowing air compressed by the second compressor to the engine while bypassing the first compressor.

Another example method for an engine comprises: during a first vehicle moving condition, operating an upstream compressor with an intake throttle open and a bypass valve coupled to only the upstream compressor closed to supply compressed air to an engine while a downstream compressor spins up; and during a second vehicle stopped condition, operating the upstream compressor with the intake throttle and the bypass valve closed to supply compressed air to a sealed portion of an intake passage while the downstream compressor is disabled. In the preceding example, additionally or optionally, the method further comprises, during the second condition, drawing compressed air from the sealed portion of the intake passage and supplying the compressed air to a vehicle component external to the engine. In any or all of the preceding examples, additionally or optionally, the method further comprises, during the second condition, drawing compressed air from the sealed portion of the intake passage into a storage device via an ejector to generate vacuum at the ejector, and supplying the vacuum generated at the ejector to an engine vacuum actuator. In any or all of the preceding examples, additionally or optionally, the upstream compressor is coupled to an electric motor and the downstream compressor is coupled to an exhaust turbine, and wherein operating the upstream compressor during the first condition includes spinning the compressor via the motor operating at motor speed based on driver torque demand, and operating the upstream compressor during the second condition includes spinning the compressor via the motor operating at a maximum possible motor speed. In any or all of the preceding examples, additionally or optionally, during the first condition, a waste-gate valve coupled across the exhaust turbine is closed, and during the second condition, the waste-gate valve coupled across the exhaust turbine is open, and wherein an engine speed during the first condition is above idling speed and during the second condition is at idling speed. In any or all of the preceding examples, additionally or optionally, the method further comprises, during the first condition, after the downstream compressor spins up, opening the bypass valve to supply compressed air to the engine from the downstream compressor while bypassing the upstream compressor.

Another example method for an engine of a vehicle comprises: in response to engine idling while the vehicle is stopped, closing each of an intake throttle and a bypass valve to seal a portion of an intake passage housing each of an upstream compressor and a downstream compressor; selectively operating only the upstream compressor; during a first condition, drawing compressed air from the sealed portion, bypassing an ejector, and applying the compressed air to a first vehicle actuator; and during a second condition, drawing compressed air from the sealed portion via the ejector, and applying vacuum generated at the ejector to a second, different vehicle actuator. In the preceding example, additionally or optionally, during the first condition, a pressure level of a pressure storage device coupled to the first vehicle actuator is lower than a threshold pressure, and wherein during the second condition, a vacuum level of a vacuum storage device coupled to the second vehicle actuator is lower than a threshold vacuum. In any or all of the preceding examples, additionally or optionally, one or more of the first vehicle actuator and the second vehicle actuator is external to the engine, and wherein the first vehicle actuator includes one of vehicle tires and vehicle air suspensions. In any or all of the preceding examples, additionally or optionally, the upstream compressor is a compressor of an electric supercharger and the downstream compressor is a compressor of a turbocharger, and wherein selectively operating only the upstream compressor includes spinning the upstream compressor via the electric motor, the electric motor operating at a full duty cycle.

In a further representation, a vehicle system comprises: wheels having tires; an engine having an intake passage; a first intake compressor driven by an electric motor, the motor powered by a battery; a second intake compressor driven by an exhaust turbine, the second compressor positioned downstream of the first compressor along the intake passage; an intake throttle positioned downstream of the second compressor along the intake passage; a bypass including a bypass valve coupled across the first compressor; a waste-gate including a vacuum-actuated waste-gate valve coupled across the exhaust turbine, the waste-gate valve coupled to a vacuum source; a pressurized pick-up line coupled to the intake passage via a pick-up port at a location upstream of the first compressor and downstream of an inlet of the bypass valve, the pick-up line including a pick-up valve and an ejector; and a controller. The controller may be configured with computer readable instructions stored on non-transitory memory for: responsive to a drop in vacuum level at the vacuum source, spinning the first compressor via the electric motor with each of the intake throttle and the bypass valve closed while the engine is at an idling speed and the vehicle is not moving; opening the pick-up valve and drawing air compressed by the first compressor into the pick-up line via the ejector; and replenishing the vacuum source with vacuum drawn at the ejector. In the preceding example, additionally or optionally, the controller may include further instructions for, responsive to a drop in tire pressure, spinning the first compressor via the electric motor with each of the intake throttle and the bypass valve closed while the engine is at the idling speed and the vehicle is not moving; opening the pick-up valve and drawing air compressed by the first compressor into the pick-up line bypassing the ejector; and inflating the tires with compressed air drawn into the pick-up line. In any or all of the preceding examples, additionally or optionally, while spinning the first compressor with each of the intake throttle and the bypass valve closed, the controller may fully open the waste-gate valve to disable the second compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during engine idling and while a vehicle is not propelled, sealing a portion of an intake passage by closing each of an intake throttle and a bypass valve coupled to an electric supercharger;
operating the supercharger to generate compressed air in the sealed portion;
flowing the compressed air from the sealed portion into a device; and
applying the compressed air to one or more of a compressed air actuator and a vehicle component including vehicle tires and a vehicle air suspension system.

2. The method of claim 1, wherein the compressed air is applied via a pressurized air pick-up line, and wherein applying the compressed air includes actuating a pick-up valve to an open position, the pick-up valve coupling the pressurized air pick-up line to the sealed portion of the intake passage.

3. The method of claim 1, wherein the electric supercharger is coupled upstream of a turbocharger, the electric supercharger including a first compressor driven by an electric motor, the turbocharger including a second compressor driven by an exhaust turbine, the second compressor positioned downstream of the first compressor in the intake passage.

4. The method of claim 3, wherein the intake throttle is coupled in the intake passage, downstream of the second compressor.

5. The method of claim 3, wherein operating the supercharger includes spinning the first compressor via the electric motor operating at a full duty cycle while a waste-gate valve coupled across the exhaust turbine is opened.

6. The method of claim 5, further comprising, responsive to one of an increase in driver torque demand and a demand for vehicle propulsion, opening the intake throttle while maintaining the bypass valve closed, closing the waste-gate valve, and operating the supercharger to flow air compressed by the first compressor to an engine until turbine speed is higher than a threshold.

7. The method of claim 6, wherein operating the supercharger responsive to one of the increase in driver torque demand and the demand for vehicle propulsion includes adjusting a duty cycle of the electric motor based on the demand, the duty cycle increased to or towards the full duty cycle as the demand increases.

8. The method of claim 6, further comprising, after turbine speed is higher than the threshold, opening the bypass valve and flowing air compressed by the second compressor to the engine while bypassing the first compressor.

9. A method, comprising:
during engine idling and while a vehicle is not propelled, sealing a portion of an intake passage by closing each of an intake throttle and a bypass valve coupled to an electric supercharger;
operating the supercharger to generate compressed air in the sealed portion;
flowing the compressed air from the sealed portion into a device and flowing the compressed air through an ejector coupled to the device to generate vacuum, and applying the generated vacuum to an engine vacuum actuator, the engine vacuum actuator including one or more of a waste-gate valve, a canister purge valve, and a crankcase ventilation valve.

10. A method for an engine, comprising:
during a first vehicle moving condition, operating an upstream compressor with an intake throttle open and a bypass valve coupled to only the upstream compressor closed to supply compressed air to an engine while a downstream compressor spins up; and
during a second vehicle stopped condition, operating the upstream compressor with the intake throttle and the bypass valve closed to supply compressed air to a sealed portion of an intake passage while the downstream compressor is disabled.

11. The method of claim 10, further comprising, during the second condition, drawing compressed air from the sealed portion of the intake passage and supplying the compressed air to a vehicle component external to the engine.

12. The method of claim 10, further comprising, during the second condition, drawing compressed air from the sealed portion of the intake passage into a storage device via an ejector to generate vacuum at the ejector, and supplying the vacuum generated at the ejector to an engine vacuum actuator.

13. The method of claim 10, wherein the upstream compressor is coupled to an electric motor and the downstream compressor is coupled to an exhaust turbine, and wherein operating the upstream compressor during the first condition includes spinning the compressor via the motor operating at motor speed based on driver torque demand, and operating the upstream compressor during the second condition includes spinning the compressor via the motor operating at a maximum possible motor speed.

14. The method of claim 13, wherein during the first condition, a waste-gate valve coupled across the exhaust turbine is closed, and during the second condition, the waste-gate valve coupled across the exhaust turbine is open, and wherein an engine speed during the first condition is above idling speed and during the second condition is at idling speed.

15. The method of claim 10, further comprising, during the first condition, after the downstream compressor spins up, opening the bypass valve to supply compressed air to the engine from the downstream compressor while bypassing the upstream compressor.

16. A method for an engine of a vehicle, comprising:
in response to engine idling while the vehicle is stopped, closing each of an intake throttle and a bypass valve to seal a portion of an intake passage housing each of an upstream compressor and a downstream compressor;
selectively operating only the upstream compressor;
during a first condition, drawing compressed air from the sealed portion, bypassing an ejector, and applying the compressed air to a first vehicle actuator; and
during a second condition, drawing compressed air from the sealed portion via the ejector, and applying vacuum generated at the ejector to a second, different vehicle actuator.

17. The method of claim 16, wherein during the first condition, a pressure level of a pressure storage device coupled to the first vehicle actuator is lower than a threshold pressure, and wherein during the second condition, a vacuum level of a vacuum storage device coupled to the second vehicle actuator is lower than a threshold vacuum.

18. The method of claim 16, wherein one or more of the first vehicle actuator and the second vehicle actuator is external to the engine, and wherein the first vehicle actuator includes one of vehicle tires and vehicle air suspensions.

19. The method of claim 16, wherein the upstream compressor is a compressor of an electric supercharger and the downstream compressor is a compressor of a turbocharger, and wherein selectively operating only the upstream compressor includes spinning the upstream compressor via an electric motor, the electric motor operating at a full duty cycle.

* * * * *